(12) United States Patent
Serban et al.

(10) Patent No.: US 9,135,911 B2
(45) Date of Patent: Sep. 15, 2015

(54) AUTOMATED GENERATION OF PHONEMIC LEXICON FOR VOICE ACTIVATED COCKPIT MANAGEMENT SYSTEMS

(71) Applicants: Doinita Serban, Carlsbad, CA (US); Bhupat Raigaga, Carlsbad, CA (US)

(72) Inventors: Doinita Serban, Carlsbad, CA (US); Bhupat Raigaga, Carlsbad, CA (US)

(73) Assignees: NEXGEN FLIGHT LLC, Carlsbad, CA (US); DOINITA DIANE SERBAN, Carlsbad, CA (US)

( * ) Notice: Subject to any disclaimer, the term of this patent is extended or adjusted under 35 U.S.C. 154(b) by 0 days.

(21) Appl. No.: 14/498,897

(22) Filed: Sep. 26, 2014

(65) Prior Publication Data

US 2015/0228273 A1    Aug. 13, 2015

Related U.S. Application Data

(60) Provisional application No. 61/907,429, filed on Feb. 7, 2014.

(51) Int. Cl.
*G10L 15/04* (2013.01)
*G10L 15/02* (2006.01)

(52) U.S. Cl.
CPC ..................... *G10L 15/02* (2013.01)

(58) Field of Classification Search
CPC ......... G10L 15/02; G10L 15/04; G10L 15/18; G06K 9/62
USPC .............. 704/270, 277, 267, 260, 256.2, 256, 704/254, 251, 244, 242, 232, 200, 1; 382/159
See application file for complete search history.

(56) References Cited

U.S. PATENT DOCUMENTS

| | | | | |
|---|---|---|---|---|
| 4,398,059 A | * | 8/1983 | Lin et al. | 704/267 |
| 4,696,042 A | * | 9/1987 | Goudie | 704/254 |
| 4,710,877 A | * | 12/1987 | Ahmed | 704/1 |
| 4,725,956 A | | 2/1988 | Jenkins | |
| 4,979,216 A | * | 12/1990 | Malsheen et al. | 704/260 |
| 5,268,990 A | * | 12/1993 | Cohen et al. | 704/200 |
| 5,278,942 A | * | 1/1994 | Bahl et al. | 704/200 |
| 5,502,791 A | * | 3/1996 | Nishimura et al. | 704/256 |
| 5,515,475 A | * | 5/1996 | Gupta et al. | 704/242 |
| 5,745,649 A | * | 4/1998 | Lubensky | 704/232 |
| 5,758,023 A | * | 5/1998 | Bordeaux | 704/232 |
| 5,899,973 A | * | 5/1999 | Bandara et al. | 704/256.2 |
| 5,926,790 A | | 7/1999 | Wright | |
| 6,018,708 A | * | 1/2000 | Dahan et al. | 704/244 |
| 6,044,322 A | | 3/2000 | Stieler | |

(Continued)

*Primary Examiner* — Michael Colucci
(74) *Attorney, Agent, or Firm* — Diane Serban

(57) ABSTRACT

A system, method and program for acquiring from an input text a character string set and generating the pronunciation thereof which should be recognized as a word is disclosed. The system selects from an input text, plural candidate character strings which are phonemic character candidates or allophones to be recognized as a word; generates plural pronunciation candidates of the selected candidate character string and outputs the optimum pronunciation candidate to be recognized as a word; generates phonemic dictionary by combining data in which the pronunciation candidate with optimal recognition is respectively associated with the character strings; generates recognition data in which character strings respectively indicating plural words contained in the input speech are associated with pronunciations; and outputs a combination contained in the recognition data, out of combinations each consisting of one of the candidate character strings and the one of the pronunciations candidates with the optimum recognition.

8 Claims, 3 Drawing Sheets

(56) References Cited

U.S. PATENT DOCUMENTS

| | | | |
|---|---|---|---|
| 6,125,341 A | 9/2000 | Raud | |
| 6,173,192 B1 | 1/2001 | Clark | |
| 6,208,964 B1* | 3/2001 | Sabourin | 704/244 |
| 6,243,680 B1* | 6/2001 | Gupta et al. | 704/260 |
| 6,285,926 B1 | 9/2001 | Weiler | |
| 6,446,041 B1* | 9/2002 | Reynar et al. | 704/260 |
| 6,512,527 B1 | 1/2003 | Barber | |
| 6,529,706 B1 | 3/2003 | Mitchell | |
| 6,567,395 B1 | 5/2003 | Miller | |
| 6,615,177 B1* | 9/2003 | Rapp et al. | 704/277 |
| 6,704,553 B1 | 3/2004 | Eubanks | |
| 6,720,890 B1 | 4/2004 | Ezroni | |
| 6,745,165 B2 | 6/2004 | Lewis | |
| 6,832,152 B1 | 12/2004 | Bull | |
| 7,010,490 B2 | 3/2006 | Brocious | |
| 7,606,327 B2 | 10/2009 | Walker | |
| 7,606,715 B1 | 10/2009 | Krenz | |
| 8,706,680 B1 | 4/2014 | Macfarlane | |
| 8,768,704 B1 | 7/2014 | Fructuoso | |
| 2008/0069437 A1* | 3/2008 | Baker | 382/159 |
| 2009/0083034 A1* | 3/2009 | Hernandez et al. | 704/251 |
| 2012/0116766 A1* | 5/2012 | Wasserblat et al. | 704/254 |

* cited by examiner

AUTOMATED GENERATION OF PHONEMIC LEXICON FOR VOICE ACTIVATED COCKPIT MANAGEMENT SYSTEMS

CROSS-REFERENCE TO RELATED APPLICATION

The present disclosure claims priority to U.S. Provisional Patent Application Ser. No. 61/907,429, filed on Nov. 22, 2013, the entirety of which is herein incorporated by reference.

FIELD OF THE INVENTION

The present invention relates generally to voice activated aircraft cockpit management systems, and more particularly to the automation of lexicon generation and data entry procedures wherein formatted files are used in a voice recognition process as part of the voice activated cockpit operation procedures, operation and control of aircraft systems by voice, as pertaining to single and multi-engine small, large and commercial-size aircraft utilizing a voice recognition system.

More particularly, the present invention relates to a system, method and program for selecting an ergodic allophone string from an allophone character matrix and acquiring a character string and the like that should be newly recognized as a word. More specifically, the present invention relates to a system, a method, and a program for selecting, and acquiring for speech processing, an ergodic allophone character string set and relaying a pronunciation that should be recognized as a word.

BACKGROUND OF THE INVENTION

In a large vocabulary continuous speech recognition system, highly accurate speech recognition requires a word dictionary in which words and phrases included in the speech are recorded and a language model by which an appearance frequency of each word or phrase may be derived. Due to the limitations of both the capacity of current storage devices for memorizing a dictionary and CPU performance for calculating frequency values, it is desirable that these word dictionaries and this language model be minimized.

Moreover, enormous amounts of time, effort, and expense are required for manual construction of a dictionary containing even only a minimum amount of words and phrases. More specifically, when a dictionary is constructed from text, it is necessary to analyze segmentation of words, firstly, and then to assign a correct pronunciation to each of the segmented words. Since a pronunciation is information on a reading way expressed with phonetic symbols and the like, expert linguistic knowledge is necessary in order to assign such information of a pronunciation in many cases. Such work and expense can be a problem because information such as a general dictionary that's been accumulated may not be useful.

Conventional studies have been made for techniques for automatically detecting, to some extent, character strings into a text that should be recognized as words. The present invention relates to a system, method and program that will automatically generate an ergodic character string that is newly recognized as pronunciation of a word. Prior art techniques used to date merely support manual detection work while others require time intensive manual correction work since the detected character string contains lots of unnecessary words even though the character strings and the pronunciation may only be partially detected. None of the prior art techniques to date provide a language model and a statistical model that result in high voice recognition accuracy in elevated noise and vibration environment due to deficiencies in the proposed language and statistical models.

Voice recognition systems as an alternative for man-machine-interfaces are becoming more and more widely used. However, in aircraft flight environment conditions they have found limited use due to the unique challenges presented by elevated noise levels, unique grammar rules, unique vocabulary, and/or hardware limitations all associated with the cockpit environment. Meanwhile, command recognitions or selections from address book entries in mobile devices, such as mobile phones, are standard functions. In automobiles, speech recognition systems are applied to record, e.g. a starting point and an end point in a navigation or GPS system with low 60-70% accuracy to date. These voice recognition solutions are inadequate for applications that require a high degree of accuracy for safety purposes such us the cockpit flight environment.

Voice Recognition algorithms rely upon grammar and semantics to determine the best possible text match(es) to the uttered phrase(s). Conventionally they are based on Hidden-Markov-models, which enable recognition but require high computing time. Since embedded systems are often employed as computing entities, having limited computing and storing resources has added to the limitation of applications of the voice recognition to the cockpit environment to date, and engendered simplified speech recognition. Constraints in the search space and saving of the resources is coming along with less reliable speech recognition and/or less comfortable handling for the user in addition to the specific limitations imposed by the cockpit environment.

The aircraft operating environment is very unique in the grammar rules that are followed and the vocabulary that is used. The grammar suite is rather extensive including "words" that represent unusual collections of characters (e.g. intersection or fix names). Same goes for the vocabulary with specific code "words" that engender particular sequences of actions in the cockpit that are known only to professionally trained pilots and not available through use of colloquial language. Elongation of the expression to be recognized within colloquial language even without the complexity of the pilotage grammar and vocabulary will lead to extremely high requirements in memory and computing power. These factors make it difficult to develop a comprehensive grammar and vocabulary set for use on an aircraft, and this has represented one of several significant challenges to bringing voice recognition to the cockpit. The elevated noise environment in flight conditions can increase in the cockpit up to 6-7 times the general room noise level found on the ground, which adds to the complexity of the task. To overcome these challenges specialized hardware and an architecture of interdisciplinary algorithms that engender voice recognition in high noise and vibration environments and is required.

Others have attempted to use dynamic grammar for enhancing voice recognition systems. For example, U.S. Pat. No. 6,125,341, entitled "Speech Recognition System and Method," issued to H. F. Raud et al, discloses a speech recognition system having multiple recognition vocabularies, and a method of selecting an optimal working vocabulary used by the system. Each vocabulary is particularly suited for recognizing speech in a particular language, or with a particular accent or dialect. The system prompts a speaker for an initial spoken response; receives the initial spoken response; and, compares the response to sets of possible responses in an initial speech recognition vocabulary to determine a response best matched in the initial vocabulary. A working speech recognition vocabulary is selected from a plurality of speech recognition vocabularies, based on the best matched response.

U.S. Pat. No. 6,745,165, entitled "Method and Apparatus For Recognizing From Here To Here Voice Command Structures in a Finite Grammar Speech Recognition System," issued to J. R. Lewis et al, discloses a method and system that uses a finite state command grammar coordinated with application scripting to recognize voice command structures for performing an event from an initial location to a new location. The method involves a series of steps, including: recognizing an enabling voice command specifying the event to be performed from the initial location; determining a functional expression for the enabling voice command defined by one or more actions and objects; storing the action and object in a memory location; receiving input specifying the new location; recognizing an activating voice command for performing the event up to the new location; retrieving the stored action and object from the memory location; and performing the event from the initial location to the new location according to the retrieved action and object. Preferably, the enabling-activating command is phrased as "from here . . . to here." The user specifies the new location with voice commands issued subsequent to the enabling command. To reduce the occurrence of unintended events, these voice commands are counted so that if they exceed a predetermined limit, the action and object content is cleared from memory.

U.S. Pat. No. 7,010,490, entitled "Method, System, and Apparatus for Limiting Available Selections in a Speech Recognition System," issued to L. A. Brocious et al, discloses a method and system for completing user input in a speech recognition system. The method can include a series of steps which can include receiving a user input. The user input can specify an attribute of a selection. The method can include comparing the user input with a set of selections in the speech recognition system. Also, the method can include limiting the set of selections to an available set of selections which can correspond to the received user input. The step of matching a received user spoken utterance with the selection in the available set of selections also can be included.

Generally, any variation in the grammar implemented in a voice recognition system is based upon previous commands or states computed within the voice recognition system. Such types of systems would have limited applicability in an avionics environment because the grammar in cockpit management systems is very fragmented for specific cockpit procedural functions. In addition all the language and statistical models for voice recognition solutions to date require voice sample training and speaker sample averaging for accurate performance. This is yet an additional detriment to expanding these voice solutions into the flight environment due to the non-repetitive unique flight environment conditions that make the task unamenable and the prohibitive costs for the hundreds of thousands of samples to be recorded for sufficiency.

The method proposed here for automated lexicon generation to be used in voice recognition provides a natural and synthetic allophone character matrix and uses an ergodic Markov model for parsing natural and synthetic allophones into a salient utterance, resulting a library and a dictionary for the voice commands of these cockpit procedural functions to be recognized from pronunciation or phonemic syntax of allophones, and not by means of translating specific text words that engender display of procedures available to this date in operational cockpits in hard copy or visual display.

SUMMARY OF THE INVENTION

A system, method and program is provided for generating from an input speech an ergodic allophone string set which represents the pronunciation thereof, which should be recognized as a word. The system includes a candidate generation unit for generating from an input speech wherein an ergodic allophone string becomes the candidate to be recognized as a word; a pronunciation generating unit for generating the pronunciation candidate for each of the selected ergodic allophone strings by optimizing among the pronunciations of all allophones contained in the ergodic pronunciation string while one or more pronunciations are predetermined for each character; a phonemic dictionary unit for generating phonemic data by combining data in which the generated pronunciations are respectively associated with the natural and synthetic allophone character strings with the language model data; a speech recognizing unit for performing speech recognition based on the ergodic recognition of or phonemic characters or allophones and a language model, speech recognition on the input speech to generate recognition data in which ergodic allophones or phonemic character strings respectively indicating plural words contained in the input speech are associated with pronunciations; and an outputting unit for outputting a combination contained in the recognition data out of combinations each consisting of one of the candidates of a pronunciation thereof. Additionally, a program for enabling an information processing apparatus as the system is provided.

BRIEF DESCRIPTION OF THE DRAWINGS

For a complete understanding of the present invention and the advantage thereof, reference now is made to the following description taken in conjunction with the accompanying drawings.

DETAILED DESCRIPTION OF THE INVENTION

Figure 1:
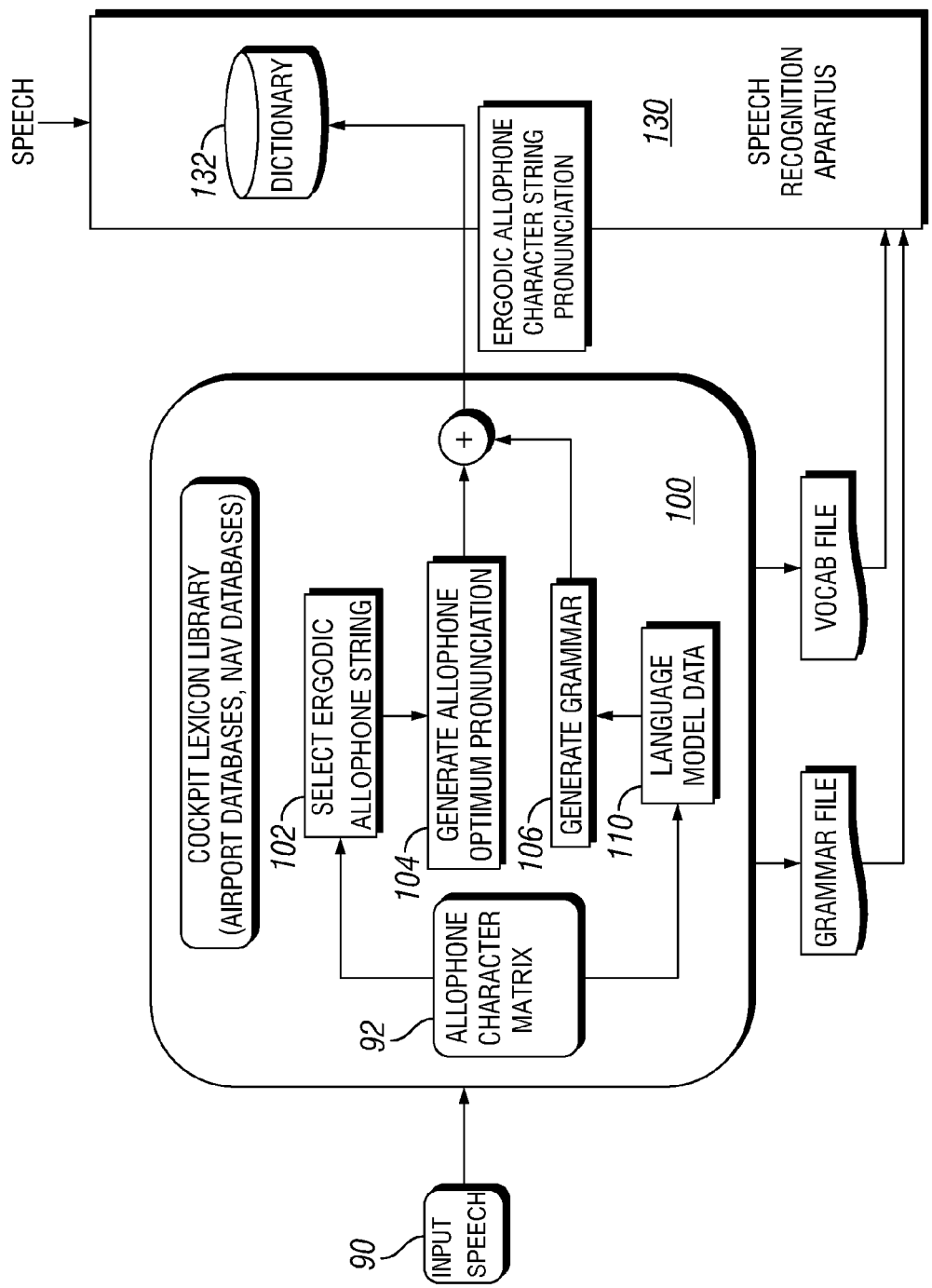
FIG. 1 illustrates an example of a process in which an ergodic allophone string and the pronunciation thereof which should be recognized as a word are newly acquired and the configuration of a word acquisition system 100 and an entirety of a periphery thereof according to the present invention.

Although the present invention will be described below by the way of an embodiment of the invention, the following embodiment does not limit the invention according to the scope of claims, and not all of combinations of characteristics described in the embodiment are essential for the solving means of the invention. Turning now to FIG. 1 there is shown an example of a process for newly acquiring an ergodic allophone string and the pronunciations thereof which should be recognized as a word. This first example is an example where a speech recognition system is used for acquisition of the ergodic string and the pronunciation.

Firstly, when an input speech is recognized by a system which supports the acquisition of the ergodic allophone string 100 generates plural candidates for pronunciations of a ergodic allophone string. Next, a speech recognition system compares each of these pronunciation candidates with the input speech acquired from a user. As a result, the candidate which is a pronunciation that is most similar to the input speech is selected and outputted in association with a character string. By using the speech recognition system in this ergodic manner, a character string of a new word not registered in the phonemic dictionary of the speech recognition system can be acquired in association with a pronunciation thereof, and thus no a priori training of the language model, acoustical model or speaker sample is necessary.

As described above, use of such ergodic processing results in a new word being acquired. However, a large amount of work and time is required if misrecognized words are numerous during construction of a dictionary of a specific field of expertise. FIG. 1 shows the configuration of the word acquisition system 100 and an entire periphery thereof according to this embodiment. A speech and a the associated pronunciation are inputted to the word acquisition system 100. This speech is of the content of a common event of a predetermined field. As for the predetermined fields, it is desirable to select one of the fields expected to contain certain words that are to be registered in the dictionary for speech recognition used in voice activation of cockpit management systems. Hereinafter, a speech and the pronunciation thereof, which have been inputted will be referred to as an input text and input speech.

The input speech acquisition system 100 selects from the allophone character matrix the ergodic allophone string which is to be recognized as a word. The word acquisition system 100 generates a plurality of candidates for the pronunciation of the ergodic allophone character string. Data thus generated will be referred to as candidate data. On the other hand, the voice recognition system calculates a confidence score at which the candidate string appears in the input speech. Herein data obtained by calculating confidence scores will be referred to as language model data 110. The language model data 110 may be a numerical value calculated for each candidate character string(s). Instead of or in addition to this, the language model data 110 may be a numerical value calculated for each set of plural consecutive candidate number strings.

Next the input speech acquisition system 100 combines the language model data 110 with the candidate data 102 and generates an optimization score, each piece of which indicates the optimum recognition accuracy of a set of an ergodic allophone string indicating a word and pronunciation thereof 104. From the sets of allophone strings and pronunciations candidates generated as candidate data 104, the input speech acquisition system 100 selects using an ergodic Markov algorithm which parses natural and synthetic allophones into a salient utterance an allophone string set and pronunciations thereof which has been obtained in the course of processing of speech recognition. The input speech acquisition system 100 then outputs the selected set to a speech processing apparatus 130. That is, outputted is a word whose pronunciation appears in the input speech, and whose corresponding character string appears at a high confidence score in the input speech. In a case where the speech recognition system employs an n-gram model, what is taken into consideration is not only confidence score of an individual word but also the confidence score of the preceding and succeeding word in the context 106.

The words having thus been outputted may be registered in a dictionary memorizing unit 132 and be used by the speech recognition apparatus as dictionary for speech processing in a field corresponding to the input speech. For example, by using the dictionary memorizing unit the speech recognition apparatus 130 recognizes the input speech and outputs actuation of functions indicating the result of the recognition of the voice commands.

Figure 2:
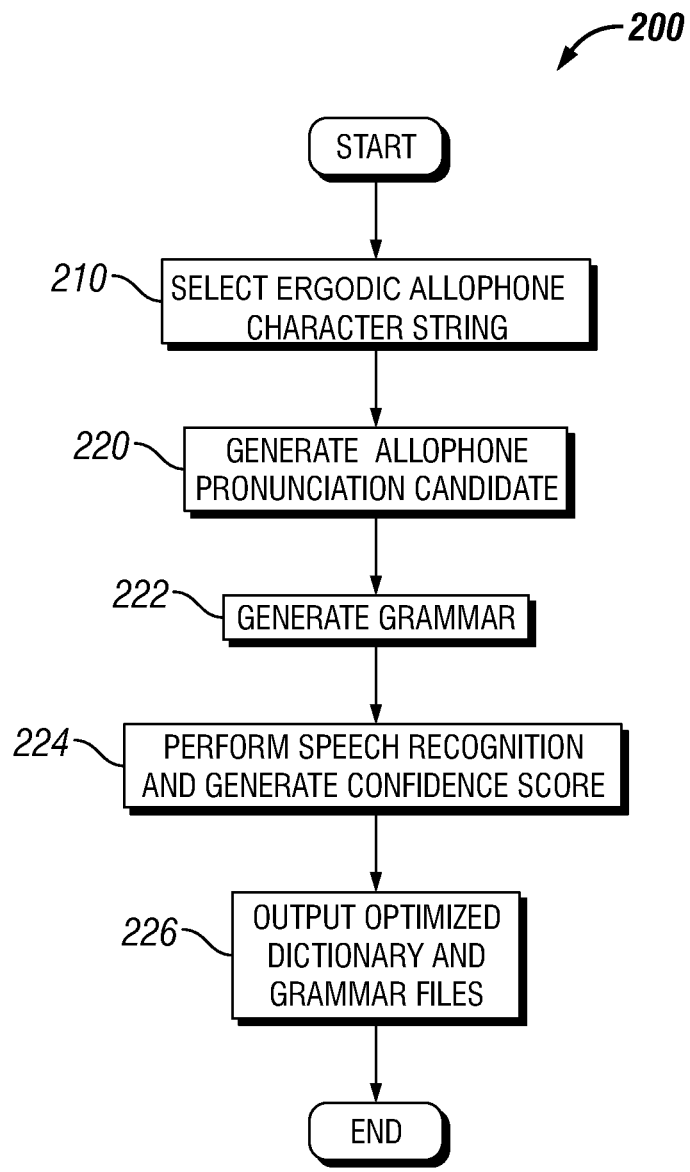
FIG. 2 illustrates a process 200 in which the word acquisition system 100 (FIG. 1) selects and outputs a character string that should be recognized as a word with optimum phonemic recognition.

Referring now to FIG. 2, there is shown a process flow in which the input speech acquisition system 200 selects and outputs an ergodic allophone string that should be recognized as a word. Firstly, the candidate selecting unit 210 selects natural allophone strings associated with the input speech from an allophone matrix, which are then parsed with synthetic allophones by an ergodic Markov algorithm into a salient utterance.

Specifically: we have $\{T\}$ be the measurable flow of process of 210 on the probability space $(X, \Sigma, \mu)$. An element A of $\Sigma$ is invariant mod 0 under $\{T\}$ $\mu(T^r(A)\Delta A)=0$ for each t∈R. Measurable sets invariant mod 0 under the flow form the invariant subalgebra of $\Sigma$, and the corresponding measure-preserving dynamical system is ergodic since the invariant subalgebra is the trivial σ-algebra consisting of the sets of measure 0 and their complements in X.

Next, with respect to the selected ergodic allophone strings, the pronunciation generating unit 220 generates the ergodic pronunciation thereof. The pronunciation candidate may be generated based on the pronunciation dictionary described above or may be generated by use of a technique called allophone n-gram. The technique called allophone n-gram is a technique utilizing the confidence score at which each allophone string and its pronunciation appears in the input speech which indicate the same contents as each other.

The confidence score generating unit 224 then performs the following processing in order to generate confidence score data. More specifically, the confidence score generating unit generates the language model data 222 based on the input speech. More particularly, the confidence score generating unit 224 first finds the score at which each of the ergodic allophone string contained in an input speech appears in the input speech and/or the confidence score at which each of the ergodic allophone strings and other synthetic allophone strings consecutively appear in the input speech. Then the confidence score generating unit 224 generates the model language data by calculating based on the confidence scores, the optimum accuracy that each of the ergodic allophone strings appears at.

Next the confidence score generating unit 224 generates the accuracy score data by combining with the language model data 222 (the candidate data in which the pronunciation candidates are respectively associated with the ergodic allophone strings.) The confidence score is configured to express a score of each set of ergodic allophone strings and pronunciation thereof.

Figure 3:
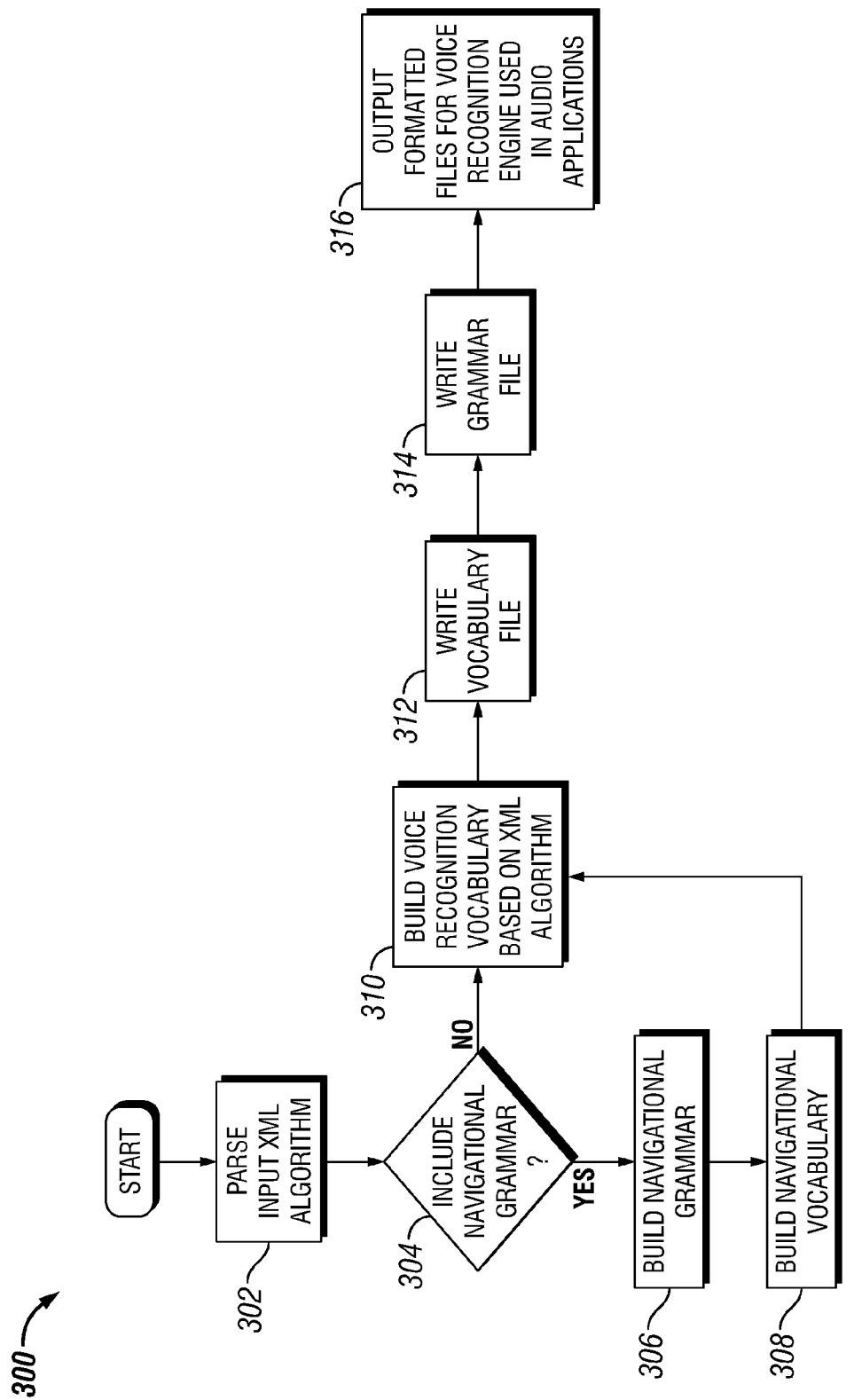
FIG. 3 shows a flow of processing in which the command acquisition system automatically selects and outputs an audio string that should be recognized as a procedure.

FIG. 3 shows a flow of processing in which the command acquisition system 300 automatically selects and outputs an audio string that should be recognized as a procedure. Firstly the candidate selecting unit 302 selects candidate command audio strings from the input speech. So as to enhance efficiency of subsequent processing, it is desirable that the candidate audio strings be limited to those likely to be recognized as procedures. Next with respect to each of the selected candidate strings, the grammar pronunciation generating unit 304 generates at least one grammar pronunciation candidate 306. The grammar pronunciation candidate may be generated based on the pronunciation dictionary as has been described above, or may be generated by use of a technique called allophone n-gram. The technique called allophone n-gram is a technique utilizing the confidence score at which each character and its pronunciation appears in a speech which indicate the same contents as each other.

Then the vocabulary generating unit 310 performs the following processing in order to generate the vocabulary file data 312. In the first place the vocabulary generating unit 308 generates the procedure language model data 310 based on the input speech command. More specifically the vocabulary generating unit 308 first finds the score at which each of the audio string step contained in an input speech procedure appears in the input speech command, and/or the confidence score at which each of the audio string steps and other command audio strings consecutively appear in the input speech. Then the vocabulary generating unit 308 generates the model language data 310 by calculating, based on the confidence scores, the optimum accuracy that each of the candidate audio strings appears at. Next the vocabulary generating unit 308 generates the accuracy score data by combining with the procedure language model data 310, the candidate data in which the pronunciation candidates are respectively associated with the candidate audio strings. The confidence score is configured to express a score of each set of candidate audio strings steps and pronunciation thereof.

From the sets of candidate audio strings and pronunciations candidates generated as candidate vocabulary data 308 and the candidate grammar data 306, the procedure acquisition system 300 selects a set of audio string steps and pronunciations which has been obtained in the course of processing of speech recognition. The procedure acquisition system 300 then outputs the selected set of audio vocabulary file 312 and audio grammar file 314 to a speech processing apparatus 130. That is, outputted is a procedure 316 whose pronunciation appears in the input speech, and whose corresponding audio string steps appear at a high confidence score in the input speech command. In a case where the speech recognition system employs an n-gram model, what is taken into consideration is not only confidence score of an individual step but also the confidence score of the preceding and succeeding step in the context.

The procedures having been thus output may be registered in a computer memorizing unit, and be used by the speech recognition apparatus 130 as procedure library for speech processing in a field corresponding to the input speech of cockpit audio operational procedures. For example by using the dictionary memorizing unit the speech recognition apparatus 130 recognizes the input speech, and outputs actuation of functions indicating the result of the recognition of the voice commands.

What is claimed is:

1. A system for processing speech recognition through the use of allophones and allophone recognition techniques, comprising:

an allophone candidate selecting unit, wherein the allophone candidate selecting unit repeats processing of adding other allophone characters to a certain allophone character string contained in the input text character by character at the front-end or the tail-end of the certain character string, until an optimization score in the input text of an allophone character string obtained by such addition is reached, and selects the allophone character string before the addition as the allophone candidate character string, and acquiring from an input text and an input speech, a set of a allophone character string and a pronunciation thereof which should be recognized as a word, a word in a sentence, or a sentence in a procedure;

a candidate selecting unit comprising one or more processors executed stored program instructions for selecting, from input text, at least one allophone candidate character string which is a candidate to be recognized as a word;

a pronunciation generating unit comprising one or more processors executing stored program instructions for generating at least one allophone pronunciation candidate of each of the selected allophone candidate character strings by combining pronunciations of all allophone characters contained in the selected allophone candidate character string, while one or more pronunciations are predetermined for each of the allophone characters;

confidence score generating unit comprising one or more processors executing stored program instructions for generating confidence score data indicating confidence score for recognition of the respective sets each constituting of an allophone character string indicating a word and a pronunciation thereof, the confidence score generated by combining data in which the generated allophone pronunciation candidates are respectively associated with the allophone character strings, with language model data prepared by previously recording numerical values based on an accuracy score at which respective allophones and their words appear in the text;

a speech recognizing unit comprising one or more processors executing stored program instructions for performing, based on the generated confidence score data, speech recognition on the input speech to generate recognition data in which allophone character strings respectively indicating plural words contained in the input speech are associated with pronunciations.

2. The system according to claim 1, wherein said score generating unit generates said language model data by calculating confidence scores at which said respective allophone candidate character strings appear in said input text and then by calculating, based on said confidence scores accuracies at which said respective allophone candidate character strings appear; and generates said confidence score data by combining the generated language model data with data in which each of said pronunciation candidates is associated with one of the allophone character strings.

3. The system according to claim 1, wherein the confidence score generating unit calculates and thus generates, as the language model data, an accuracy score for each set of at least two of consecutive allophone character strings, the accuracy indicating the frequency that each set of the consecutive allophone candidate character strings appears in an input text.

4. The system according to claim 1, wherein the score generating unit generates score data by:

selecting sets each constituting of at least two consecutive words from a group of words containing known allophones, the known allophones indicating a certain allophone character string unrecognizable as a word;

acquiring the language model data having numerical values recorded therein, the numerical value indicating a the accuracy at which each of the selected sets of consecutive words appear in a text; and associating each of the candidate character strings with the known phonemic symbol.

5. The system according to claim 1, wherein the pronunciation generating unit generates a plurality of pronunciation candidates for each of the allophone character strings by:

retrieving one or more pronunciations of each of allophone characters contained in the allophone candidate character string, from a pronunciation dictionary in which each allophone character is associated with one or more pronunciations; and combining together the retrieved pronunciations.

6. The system according to claim 1, wherein an outputting unit outputs a combination of one of the allophone candidate character strings and one of the pronunciation candidates contained in the recognition data, on condition that the combination appears in the recognition data not less than a predetermined criterial number of times.

7. The system according to claim 1, wherein based the speech recognizing unit selects one of the combinations constituting of a set of pronunciations agreeing with the input speech and a set of allophone character strings corresponding to the set of the pronunciations, the selected combination constituting of pronunciations and allophone character strings whose optimization score and confidence score have the largest product among those of the other combinations; and the outputting unit further selects and outputs some of the allophone candidate character string and some of the pronunciation candidates, the selected allophone candidate character strings and pronunciation candidates included in a predetermined criterial number of combinations of allophone character strings and pronunciations whose optimization score and confidence score have the predetermined criterial number of the largest products, the confidence scores calculated by the speech recognizing unit.

8. The system according to claim 1, wherein the input text and the input speech have the contents indicating a common event belonging to a predetermined field; and the outputting unit outputs one or more combinations among the combinations each consisting of one of the allophone candidate character strings and one of the pronunciations candidates, the outputted combinations being those contained in the recognition data, and then registers the outputted combinations in a dictionary used in speech processing in the predetermined field.

\* \* \* \* \*